(12) United States Patent
Martinez Sanchez

(10) Patent No.: US 11,978,293 B2
(45) Date of Patent: May 7, 2024

(54) ELECTRONIC LOCK WITH WIRELESS CONTROL

(71) Applicant: EXPERT SECURITY LIMITED, Dublin (IE)

(72) Inventor: Juan Francisco Martinez Sanchez, Cork (IE)

(73) Assignee: EXPERT SECURITY LIMITED, Dublin (IE)

( * ) Notice: Subject to any disclaimer, the term of this patent is extended or adjusted under 35 U.S.C. 154(b) by 0 days.

(21) Appl. No.: 17/600,063

(22) PCT Filed: Mar. 30, 2020

(86) PCT No.: PCT/EP2020/058976
§ 371 (c)(1),
(2) Date: Sep. 29, 2021

(87) PCT Pub. No.: WO2020/201219
PCT Pub. Date: Oct. 8, 2020

(65) Prior Publication Data
US 2022/0189225 A1    Jun. 16, 2022

(30) Foreign Application Priority Data
Mar. 29, 2019 (GB) ..................... 1904438

(51) Int. Cl.
*G07C 9/00* (2020.01)
*H04B 13/00* (2006.01)

(52) U.S. Cl.
CPC ....... *G07C 9/00309* (2013.01); *H04B 13/005* (2013.01); *G07C 2009/00373* (2013.01);
(Continued)

(58) Field of Classification Search
None
See application file for complete search history.

(56) References Cited

U.S. PATENT DOCUMENTS 5,204,672 A   4/1993  Brooks
5,796,827 A   8/1998  Coppersmith et al.
(Continued)

FOREIGN PATENT DOCUMENTS

EP   2608158 A1   6/2013
FR   3022092      12/2015
(Continued)

OTHER PUBLICATIONS

International Application No. PCT/EP2020/058976 as filed Mar. 30, 2020, 23 pgs.
(Continued)

*Primary Examiner* — Carlos Garcia
(74) *Attorney, Agent, or Firm* — Berkeley Law & Technology Group, LLP

(57) ABSTRACT

The method and system for access control, comprising detecting, by the electronic lock a tactile action by a body on a tactile sensor. The electronic lock transmitting a first signal using very low frequency band in response to said detection of tactile action through said body. The electronic key fob receives the first electromagnetic signal, where the first signal is transmitted through a body in contact with a transmitter of said first electromagnetic signal i.e. the electronic lock. Further, the electronic key fob transmits a second electromagnetic signal in response to receipt of said first electromagnetic signal. The electronic lock receives the second signal in response to said first signal and disengages or engages a lock in response to said received second signal.

20 Claims, 3 Drawing Sheets

(52) U.S. Cl.
CPC .............. *G07C 2009/00793* (2013.01); *G07C 2009/00809* (2013.01); *G07C 2009/00984* (2013.01); *G07C 2209/65* (2013.01)

(56) References Cited

U.S. PATENT DOCUMENTS

| | | | |
|---|---|---|---|
| 2004/0142732 A1* | 7/2004 | Ueda | G01V 15/00 |
| | | | 455/344 |
| 2007/0191998 A1* | 8/2007 | Arie | B60R 25/246 |
| | | | 701/2 |
| 2015/0162994 A1 | 6/2015 | Rodzevski et al. | |
| 2016/0375861 A1 | 12/2016 | Miyazawa | |
| 2018/0312020 A1* | 11/2018 | Saburi | B60C 23/0464 |
| 2021/0362678 A1* | 11/2021 | Jin | B60R 25/01 |
| 2022/0189225 A1* | 6/2022 | Martinez Sanchez | |
| | | | H04B 13/005 |

FOREIGN PATENT DOCUMENTS

| | | |
|---|---|---|
| GB | 2582756 A | 10/2020 |
| JP | 2017122374 A | 7/2017 |
| WO | 2001022118 A2 | 3/2001 |
| WO | 2010067390 A1 | 6/2010 |
| WO | 2020201219 A1 | 10/2020 |

OTHER PUBLICATIONS

Notification of Receipt of Record Copy dated Apr. 23, 2020 in WO Application No. PCT/EP2020/058976, 1 pg.
Notification Concerning Submission of Priority Document dated May 1, 2020 in WO Application No. PCT/EP2020/058976, 1 pg.
First Notice Informing the Applicant of the 30-Month Time Limit dated Oct. 29, 2020 in WO Application No. PCT/EP2020/058976, 1 pg.
Second Notice Informing the Applicant of the 30-Month Time Limit dated Jul. 29, 2021 in WO Application No. PCT/EP2020/058976, 1 pg.
Notification Concerning Availability of the Publication of the International Application dated Oct. 8, 2020 in WO Application No. PCT/EP2020/058976, 1 pg.
International Search Report and Written Opinion dated Jun. 26, 2020 in WO Application No. PCT/EP2020/058976, 17 pgs.
International Preliminary Report on Patentability dated Oct. 14, 2021 in WO Application No. PCT/EP2020/058976, 11 pgs.
Notice of Publication dated Sep. 8, 2020 in GB Application No. 1904438.7, 2 pgs.
GB Application No. 1904438.7 as filed Mar. 29, 2019, 16 pgs.
Search and Examination Report dated Sep. 13, 2019 in GB Application No. 1904438.7, 9 pgs.

* cited by examiner

ELECTRONIC LOCK WITH WIRELESS CONTROL

FIELD

The present disclosure relates to a method and system for access control and interaction/activity monitoring. More specifically the present disclosure relates to locking or unlocking of a door or an entrance or provides access to a user.

BACKGROUND

It is well known that radio frequency key fobs are used for granting access e.g. by opening a door. A user is required to press a lock/unlock button and such an action causes the key fob to transmit or establish communication with the access controller. If the key fob is duly authorized by the access controller, access is granted to the user. Hence, a user is required to press a button to activate the key fob to begin the process of gaining access. This may be cumbersome and difficult in scenarios where both of the user's hands are busy e.g. holding shopping bags, etc. Therefore, it is desirable to have a method and system which overcomes the above problem.

A person skilled in the art would appreciate that devices based on capacitive or inductive coupling either require a wearable or an implant. However, such limitations cause additional inconvenience to a user. Further, air-gaps between the key fob and the body shall have a huge impact on the performance of the device when based on capacitive or inductive coupling.

WO2010/067390 discloses communications between a mobile device and a fixed device using a single bidirectional channel where the human body is an extension of the receiver antenna.

Numerous other patent publications exist in the art for providing an access control system in which a door controller, reader or lock or the like communicates with a mobile key (or fob) via RF signals. For example, European patent publication number EP 2 608 158 discloses a system with Intrabody and RF communications between a biometric reader and a wearable/portable device. This system relies on intrabody capacitive communication so that capacitive coupling is used for the intrabody communication, where direct contact is mentioned when interacting with the reader device and also when describing the wearable device. French patent publication number FR3022092 discloses a system that uses a combination of Near Field Communications (NFC) and RF communications. U.S. Pat. No. 5,796,827 is another device that is based on the contact or close proximity for operation resulting in a very limited distance due to contact or coupling to perform communications.

Hence, there is an unresolved need for a method and system for access control which solves the above mentioned technical problems of the art.

SUMMARY

The present invention, as set out in the appended claims, is directed to a method and system for access control. The system for access control comprises an electronic lock and an electronic key fob.

In one embodiment the electronic lock comprises means for detecting a tactile action by a user's body on a tactile sensor/conductive element, means for transmitting a first signal through said body in response to said detection of tactile action, means for receiving a second signal in response to said first signal and means for disengaging or engaging a lock in response to said received second signal. The first signal is transmitted through the body wherein said body causes said tactile action.

The means for transmitting the first signal comprises a very low frequency wireless transceiver (VLF/LF) and the body acts as an antenna and/or transmission media for transmitting said first signal.

The means for receiving the second signal comprises an ultra high frequency or a super high frequency wireless transceiver. In an embodiment means for receiving the second signal comprises a Bluetooth™ protocol transceiver or any other suitable RF technology system.

The present invention uses a multi radio approach for access control communications between a reader and a remote device (wearable/portable) whereas one of the signals, used as wake up command ID, travels through the human body and reaches the remote device, enabling a secondary radio communications. The secondary communication channel is typically a SHF or UHF signal.

Suitably the method and system of the invention uses the body as an extended antenna for transmission of the wake up command ID when in contact with the reader. This signal used for body communications is VLF/LF. The human body irradiates a very short range field that is picked up by the wearable/portable device through a resonant receiver. Using this approach the range of the portable device can be extended to a portable device that the user may carry in a bag, handbag or backpack and not just the typical wearable device like a watch.

In one embodiment the electronic key fob comprises means for receiving a first electromagnetic signal in the very low or low frequency bands (VLF/LF), said first signal transmitted through a body in contact with a transmitter of said first electromagnetic signal and means for transmitting a second electromagnetic signal in response to receipt of said first electromagnetic signal. The means for receiving the first signal comprises a very low or low frequency (VLF/LF) wireless transceiver. The means for transmitting the second signal comprises an ultra high frequency or a super high frequency wireless transceiver. In an embodiment the means for transmitting the second signal comprises a Bluetooth™ protocol transceiver or any other suitable RF technology system.

In one embodiment the method comprises the steps of detecting, by the electronic lock a tactile action by a body on a tactile sensor and the electronic lock transmitting a first signal using very low frequency band (VLF/LF) in response to said detection of tactile action through said body. The electronic key fob receives the first electromagnetic signal, where the first signal is transmitted through a body in contact with a transmitter of said first electromagnetic signal i.e. the electronic lock.

In one embodiment the electronic lock is a lock for a car or vehicle door or boot of a car or vehicle.

Further, the electronic key fob transmits a second electromagnetic signal in response to receipt of said first electromagnetic signal. The electronic lock receives the second signal in response to said first signal and disengages or engages a lock in response to said received second signal. The second signal is an ultra high frequency electromagnetic signal or a super high frequency electromagnetic signal.

It will be appreciated that the invention does not focus on new cyphering methods. The invention makes use of the Bluetooth protocol security and adds an extra layer by using a secondary unique ID that triggers the Bluetooth communications to happen in a very short range. The system and method of the invention is more secure in the sense that a portable device is effectively off (deep sleep) until the touch event occurs. Through the touch event a VLF/LF signal is transmitted through the human body on contact with the reader. Until this wake-up signal is received, the portable device is on standby, without broadcasting any information on Bluetooth or any other radio, like other prior art devices do for proximity detection.

In one embodiment a RF communication interface module is provided configured for the primary wake-up signal that allows the secondary bidirectional communication to occur. The frequencies used can vary from 1 Hz to 150 kHz (LF/VLF), being around 25 kHz to 30 kHz in most use cases. Prior art systems that claimed intrabody communications, work in the LF domain only (usually 125-150 kHz). By reducing the frequencies to the VLF domain, around or below 30 kHz, it was proven that a tighter control of distance, due to amount of field radiated by the body in relation to lower frequencies resulting in longer wavelengths to be achieved.

In one embodiment a RF communication interface module is provided, on the receiver side (portable device), and comprises the capability of using one, two or three antennae elements. In this case by strategic physical placement of the same, the receiver is able to discriminate the direction in which the filed has been received. This information can add valuable information about the relative placement and orientation of the device in relation to the target to avoid false triggers that may occur, for example by placing the receiver too close to the reader from the inside of an access controlled door/gate, in such a way that a touch event from the outside could, with some sort of passive amplification, allow the receiver to wake-up and perform an unintended successful authentication event, granting access to a user that should not be granted access.

In one embodiment the invention can use Bluetooth or Sug-Giga RF (e.g. 433 MHz) or any other RF technology for short range bidirectional communication and authentication. In this case the RF communication interface relates to the secondary signal mentioned above whereas secure authentication occurs to grant access to the user. In the case of Bluetooth, typical 2.4 Ghz is the frequency used. In the case of using Sub-Giga RF communications the frequencies may vary depending on the licensing of the ISM spectrum in determined geographical regions. Sub-GiGa RF operates in the ISM spectrum bands below 1 Ghz—typically in the 769-935 MHz, 315 Mhz and the 468 Mhz frequency range. This spectrum band below 1 Ghz is particularly useful for RF IOT applications.

Thereby, the present invention provides a method and system for access control which overcomes the problems identified above while also being able to monitor activities and/or interactions between the technology enabled device and the end user that carries the portable device.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

Figure 1:
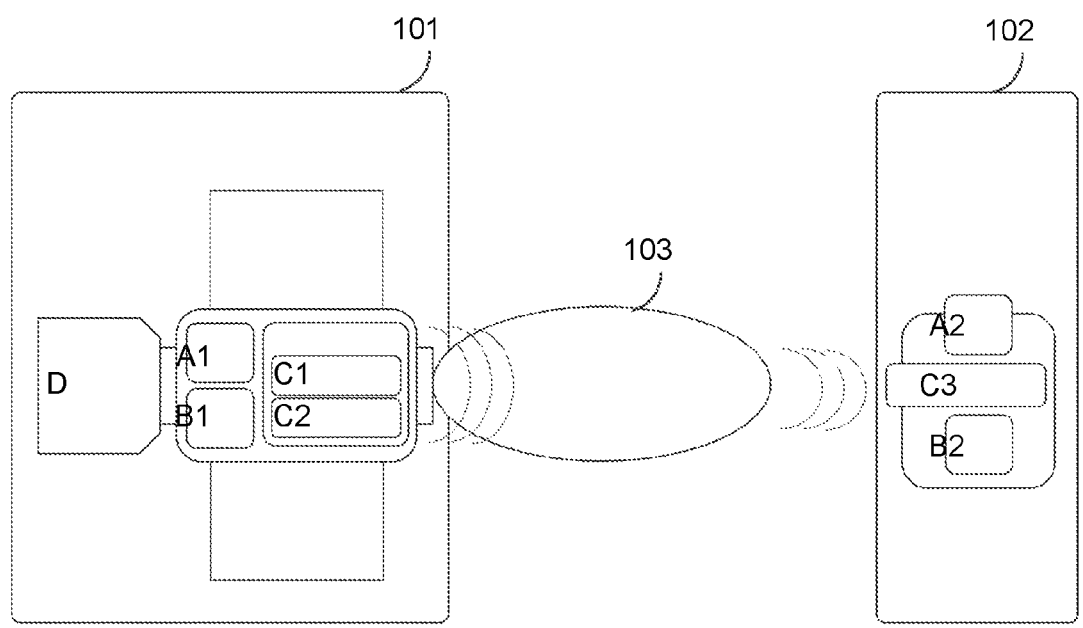
FIG. 1 exemplarily illustrates the components of a system for access control.

The present invention is directed to a method and system for access control. FIG. 1 exemplarily illustrates the components of a system for access control. The system for access control comprises an electronic lock 101 and an electronic key fob 102. A predefined signal (with certain modulation and encoding) is generated by the electronic lock 101 and transmitted through a conductive element, which may be a cylinder of the electronic lock 101. In order to lock or unlock the electronic lock 101, a user touches an exposed portion of the electronic lock 101, which causes the predefined signal to travel through the user's body 103. In other words the user's body acts as an antenna and/or medium for the transmission of the predefined signal depending on the location of the receiver device. The predefined signal is received by an electronic key fob 102 placed in close proximity to the user's body (pocket, pendant, belt, or in a backpack or handbag carried by the user). When in close proximity to the body, e.g. pocket, it can be considered that body coupling between the user and the portable device occurs; however, when within a certain distance from the users body, e.g. backpack, the receiver is able to read the electromagnetic signal that the human body irradiates, behaving like an antenna.

Once the predefined signal is received by electronic key fob 102, the electronic key fob 102 wakes up a secondary encrypted and secured radio which then performs the necessary communication with the electronic lock 101 which results in an actuation event to occur e.g. the electronic lock actuates a lever to allow access to a door. For this secondary radio, i.e. Bluetooth, different levels of authentication can be implemented as required by the end application, while also taking advantage of the RSSI of the received signal to identify the distance at which the user might be from the lock that is trying to unlock in order to discriminate from false and/or unintentional events.

Figure 2:
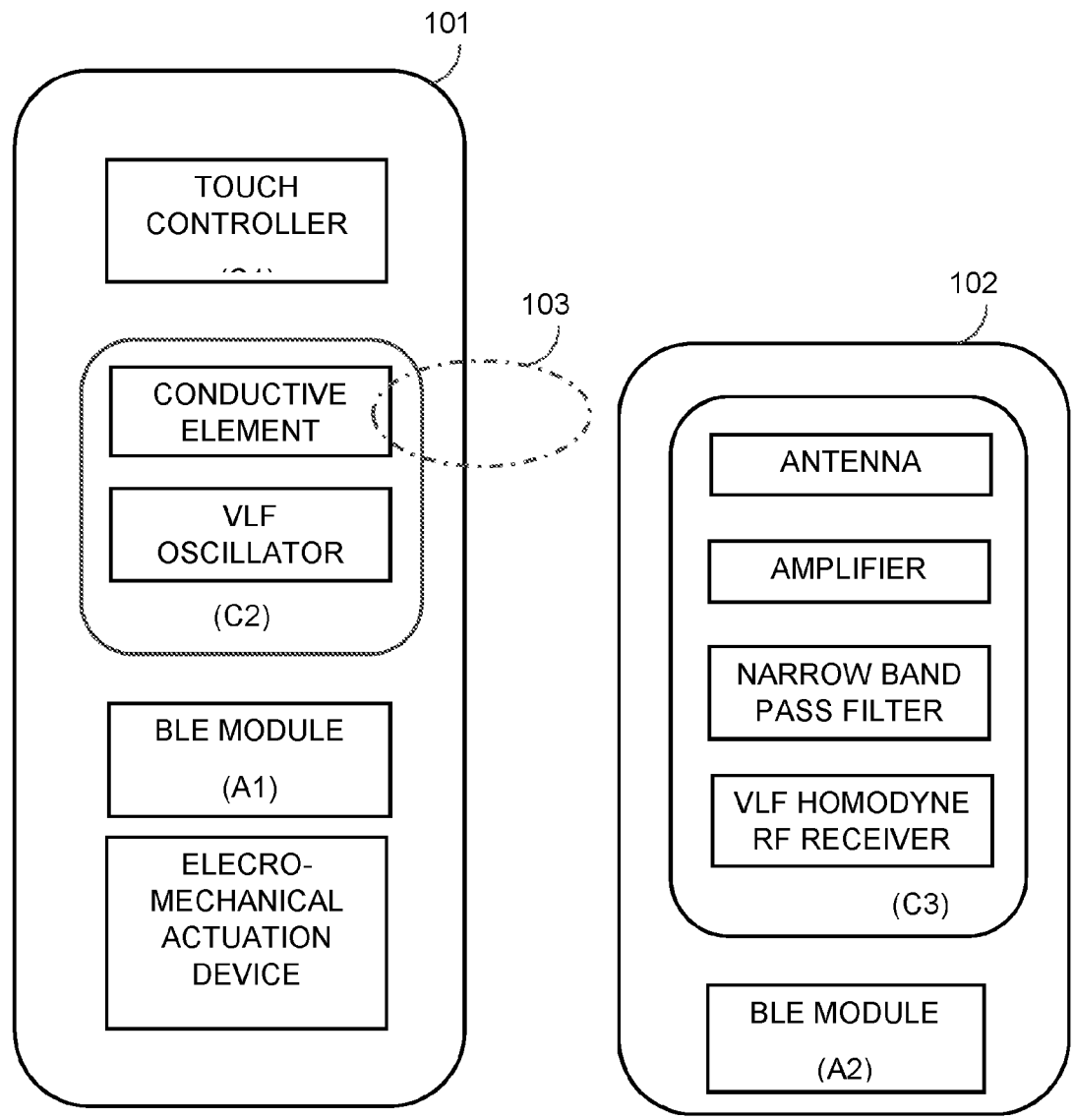
FIG. 2 is a functional block diagram exemplarily illustrating the primary components of the system for access control.

FIG. 2 is a functional block diagram exemplarily illustrating the primary components of the system for access control.

The electronic lock 101, comprises a touch controller C1, a conductive element coupled to a very low frequency (VLF/LF) transmitter C2, a Bluetooth™ low energy (BLE) module A1 and an electro-mechanical actuation device D. The conductive element in cooperation with the touch controller C1 detects a tactile action by a user's body 103 on the conductive element. Once the tactile action is detected, the VLF/LF transmitter coupled to the conductive element, transmits a first signal through said user's body i.e. the body acts as an antenna for transmitting said first signal. A second signal is received by the BLE module A1 in response to said first signal and an electro-mechanical actuation device D disengages or engages a lock in response to said received second signal. In an embodiment the first signal is transmitted by a very low frequency wireless transceiver. In another embodiment, the second signal receiving means comprises an ultra high frequency or a super high frequency wireless transceiver.

The electronic key fob 102, comprises a VLF/LF transceiver C3 for receiving a first electromagnetic signal in the very low and low frequency band, said first signal transmitted through a body in contact with a transmitter of said first electromagnetic signal and a BLE module A2 for transmitting a second electromagnetic signal in response to receipt of said first electromagnetic signal.

The VLF/LF transceiver C3 comprises an antenna/ae, amplifier, a narrow bandpass filter and a VLF/LF RF receiver and/or homodyne SDR, where the VLF/LF transceiver is configured to detect or receive the transmitted first signal. This can be achieved through a very simple SDR implemented at a microcontroller level using homodyne detection, but also through any custom or integrated instrumentation discrete solution.

In an embodiment, the electronic key fob 102 comprises an ultra high frequency or a super high frequency wireless transceiver for transmitting the second signal. In an embodiment the means for transmitting the second signal comprises a Bluetooth™ protocol transceiver.

The working of the above components is described in detail in the following paragraphs.

The conductive element in communication with the touch controller wakes up for a few milliseconds every second from a standby state to poll for a touch event to occur. Once, a tactile action is detected on the conductive element/tactile sensor i.e. once a user touches the conductive element of the electronic lock 101 using his/her fingers a tactile action is detected.

Once a tactile action is detected, the VLF/LF oscillator or a VLF/LF transceiver wakes up and transmits a VLF/LF modulated signal comprising a predefined identifier of the electronic lock 101. The VLF/LF modulated signal via the conductive element travels through the body of the user who is in direct contact with the conductive element of the electronic lock 101. The VLF/LF transceiver C3 of the electronic key fob 102 receives the VLF/LF modulated signal. In other words, the electronic lock 101 transmits a first signal using very low frequency band in response to said detection of tactile action through said body 103. The electronic key fob 102 receives the first electromagnetic signal, where the first signal is transmitted through a user's body 103 in contact with a transmitter of said first electromagnetic signal i.e. the conductive element of the electronic lock 101.

The electronic key fob 102 further verifies as to whether the electronic key fob 102 matches with the electronic lock 101 by comparing the received identifier of the electronic lock 101. Upon successful verification, the Bluetooth module A2 of the electronic key fob 102 wakes up to transmit lock engage/disengage signal to the Bluetooth module A1 of the electronic lock 101. A person skilled in the art would appreciate that the electronic lock 101 and the electronic key fob 102 are previously paired. In other words, the electronic key fob transmits a second electromagnetic signal in response to receipt of said first electromagnetic signal. The electronic lock receives the second electromagnetic signal in response to said first signal and disengages or engages a lock in response to said received second signal. The second signal is an ultra high frequency electromagnetic signal or a super high frequency electromagnetic signal.

Figure 3:
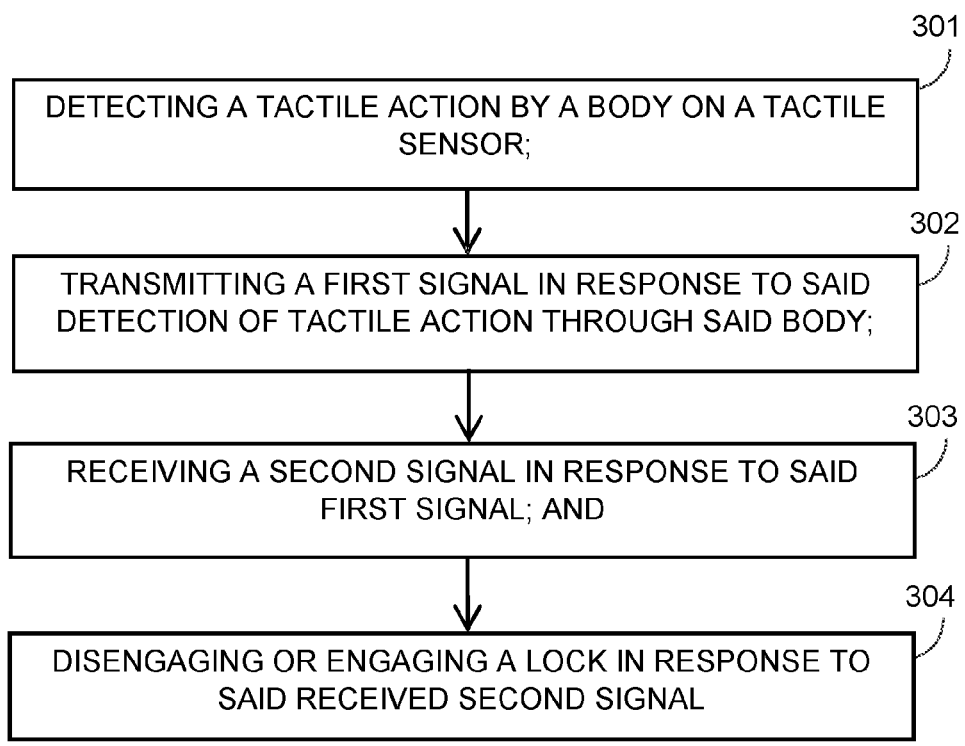
FIG. 3 is a flowchart of the method for access control, according to one embodiment of the invention.

FIG. 3 is a flowchart of the method for access control. As disclosed above, the method comprises detecting 301, by the electronic lock a tactile action by a body on a tactile sensor. The electronic lock transmitting 302 a first signal using very low frequency band in response to said detection of tactile action through said body. The electronic key fob receives the first electromagnetic signal, where the first signal is transmitted through a body in contact with a transmitter of said first electromagnetic signal i.e. the electronic lock. Further, the electronic key fob transmits a second electromagnetic signal in response to receipt of said first electromagnetic signal. The electronic lock receives 303 the second signal in response to said first signal and disengages or engages 304 a lock in response to said received second signal.

Further, a person ordinarily skilled in the art will appreciate that the various illustrative logical/functional blocks, modules, circuits, and process steps described in connection with the embodiments disclosed herein may be implemented as electronic hardware, or a combination of hardware and software. To clearly illustrate this interchangeability of hardware and a combination of hardware and software, various illustrative components, blocks, modules, circuits, and steps have been described above generally in terms of their functionality. Whether such functionality is implemented as hardware or a combination of hardware and software depends upon the design choice of a person ordinarily skilled in the art. Such skilled artisans may implement the described functionality in varying ways for each particular application, but such obvious design choices should not be interpreted as causing a departure from the scope of the present invention.

The process described in the present disclosure may be implemented using various means. For example, the apparatus described in the present disclosure may be implemented in hardware, firmware, software, or any combination thereof. For a hardware implementation, the processing units, or processors(s) or controller(s) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, software codes may be stored in a memory and executed by a processor. Memory may be implemented within the processor unit or external to the processor unit. As used herein the term "memory" refers to any type of volatile memory or non-volatile memory.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method for access control, comprising:
   detecting a tactile action by a body on a tactile sensor;
   transmitting a first signal in response to said detection of tactile action through said body wherein the first signal is a very low frequency/low frequency (VLF/LF) electromagnetic signal;
   receiving a second signal in response to said first signal; and
   disengaging or engaging a lock in response to said received second signal;
   wherein said body acts as an antenna.

2. The method of claim 1 wherein said first signal is transmitted through the body wherein said body causes said tactile action.

3. The method of claim 1 wherein said body acts as a conductive media for transmitting said first signal.

4. The method of claim 1, wherein said body acts as said antenna for transmitting said first signal.

5. The method of claim 1 wherein the second signal is an ultra high frequency electromagnetic signal or a super high frequency electromagnetic signal.

6. The method of claim 5 wherein the second signal complies with Bluetooth™ protocol or a suitable RF technology system.

7. The method of claim 1, further comprising:
receiving, by the remote device, the first signal; and
transmitting, by the remote device, the second signal in response to receipt of said first signal.

8. The method of claim 7, wherein said second signal is an ultra high frequency electromagnetic signal or a super high frequency electromagnetic signal.

9. The method of claim 8, wherein said second signal complies with Bluetooth™ protocol or a suitable RF technology system.

10. The method of claim 7, wherein said body acts as said antenna and/or a conductive media for transmitting said first signal.

11. An electronic lock, comprising:
a module for detecting a tactile action by a body on a tactile sensor;
a module for transmitting a first signal through said body in response to said detection of tactile action to an electronic key fob, wherein the first signal is a very low frequency/low frequency (VLF/LF) electromagnetic signal;
a module for receiving a second signal in response to said first signal from the electronic key fob; and
a module for disengaging or engaging a lock in response to said received second signal, wherein said body acts as an antenna for transmitting said first signal.

12. The electronic lock of claim 11 wherein the module for transmitting the first signal comprises a very low frequency wireless transceiver.

13. The electronic lock of claim 11 wherein said first signal is transmitted through the body wherein said body causes said tactile action.

14. The electronic lock of claim 11 wherein the module for receiving the second signal comprises an ultra high frequency or a super high frequency wireless transceiver.

15. The electronic lock of claim 11 wherein the module for receiving the second signal comprises a Bluetooth™ protocol transceiver.

16. A system, comprising:
an electronic lock, comprising:
a module for detecting a tactile action by a body on a tactile sensor; a module for transmitting a first signal through said body in response to said detection of tactile action to an electronic key fob, wherein the first signal is a very low frequency/low frequency (VLF/LF) electromagnetic signal;
a module for receiving a second signal in response to said first signal from the electronic key fob; and
a module for disengaging or engaging a lock in response to said received second signal, wherein said body acts as an antenna for transmitting said first signal; and
an electronic key fob, comprising:
a module for receiving the first signal; and
a module for transmitting the second signal in response to receipt of said first signal.

17. The system of claim 16, wherein said body acts as a conductive media for transmitting said first signal.

18. The system of claim 16, wherein said first signal is transmitted through the body wherein said body causes said tactile action.

19. The system of claim 16, wherein said second signal is an ultra high frequency electromagnetic signal or a super high frequency electromagnetic signal.

20. The system of claim 19, wherein said second signal complies with Bluetooth™ protocol or a suitable RF technology system.

* * * * *